July 24, 1934.  P. J. FITZGERALD  1,967,465
MIXING MACHINE TURNTABLE
Filed Dec. 6, 1932  2 Sheets-Sheet 1

WITNESS:
O H Cook

INVENTOR
Patrick J. Fitzgerald
BY
Joshua R H Potts
HIS ATTORNEY

July 24, 1934.    P. J. FITZGERALD    1,967,465
MIXING MACHINE TURNTABLE
Filed Dec. 6, 1932    2 Sheets-Sheet 2
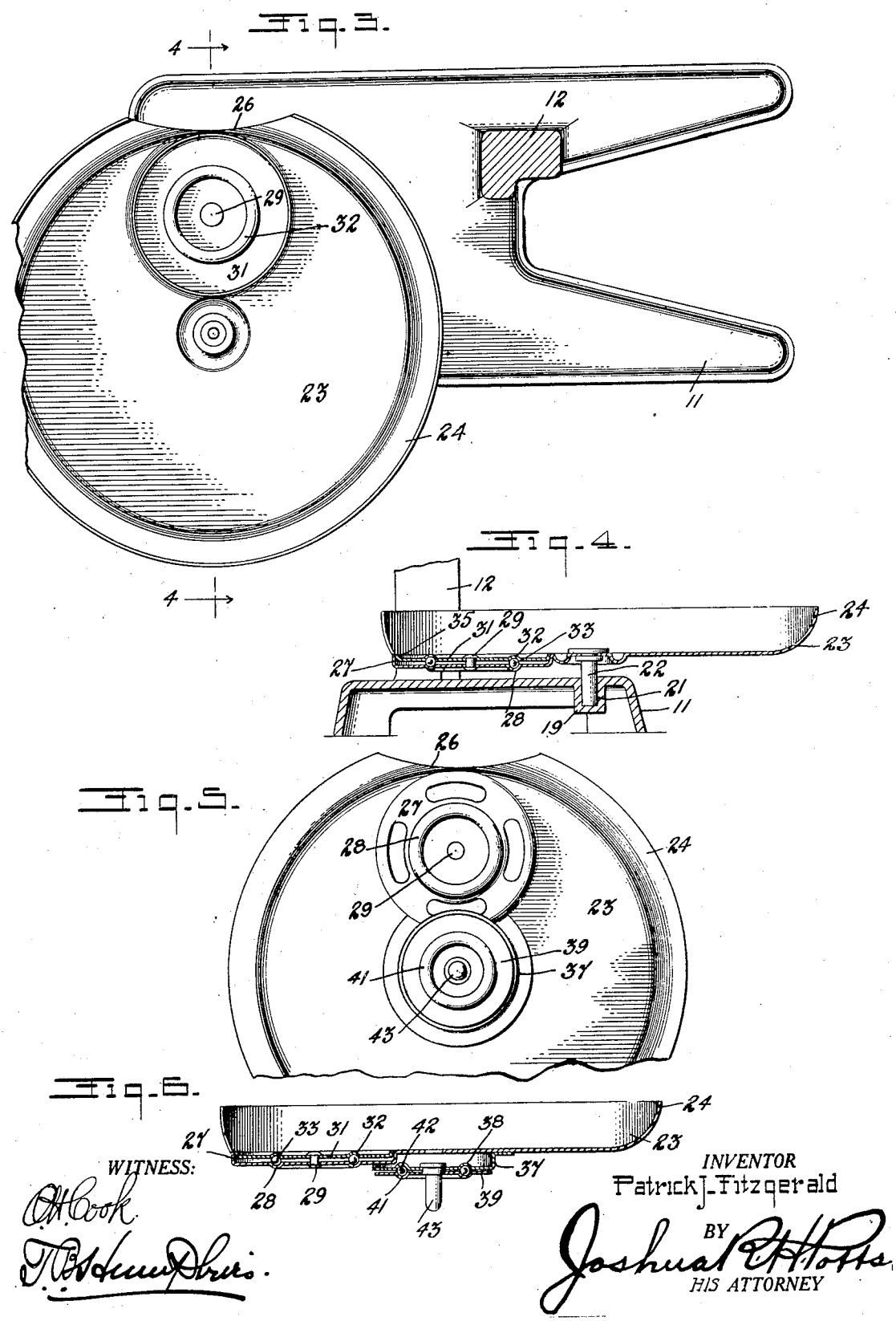

Patented July 24, 1934

1,967,465

UNITED STATES PATENT OFFICE 1,967,465

MIXING MACHINE TURNTABLE

Patrick J. Fitzgerald, Torrington, Conn., assignor to The Fitzgerald Mfg. Company, Torrington, Conn., a corporation of Connecticut Application December 6, 1932, Serial No. 645,930

8 Claims. (Cl. 259—84)

This invention relates to turntables for mixing machines, and particularly to turntables for supporting mixing vessels of different diameters. The mixing machine contemplated is of that type known as a household mixing machine for use in mixing cake batters, fillings for pies, meringues, mayonnaise, salad dressings, etc.

This invention is closely allied with an application filed on even date herewith, entitled "Base mechanism for mixing machines", Serial No. 645,932.

The mixing machine, per se, forms the subject-matter of an application for United States Letters Patent filed April 12, 1932, Serial No. 604,844.

In mixing different articles it is quite essential that on account of the differences in bulk, vessels of different sizes must be employed, and as it is also essential that the vessel be rotated during the mixing process and that the mixing implement be properly located in the mixing vessel, provision must be made for rotating vessels of different sizes from different centers.

In the application first above mentioned, the turntable was located on a pivoted lever whose movement provided for the vessels of different diameters.

The object of this invention is to provide means associated with the mixing machine, whereby vessels of different diameters may be employed without any manipulation of the machine or its parts.

According to the invention, the mixing machine base has a single hole and the turntable has a central stud which fits into that hole, and said turntable is provided with means for rotating vessels of different diameters from different centers.

Figure 1:
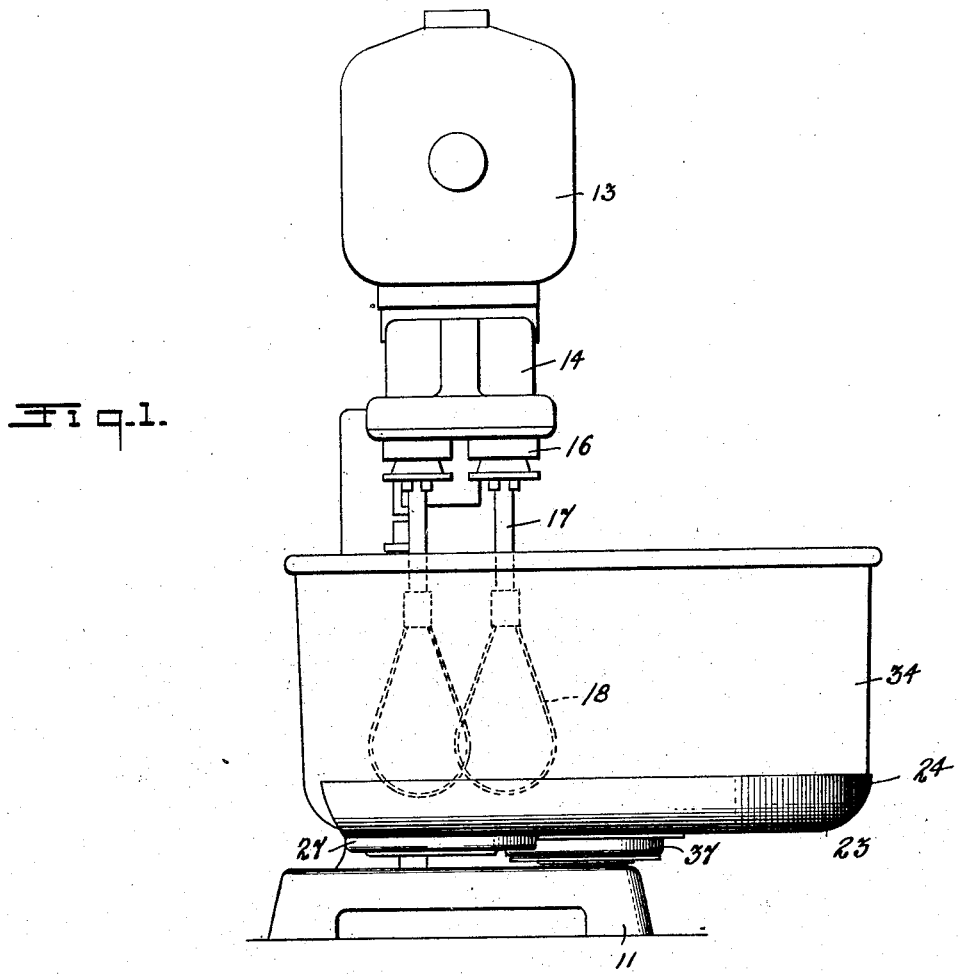
Figure 2:
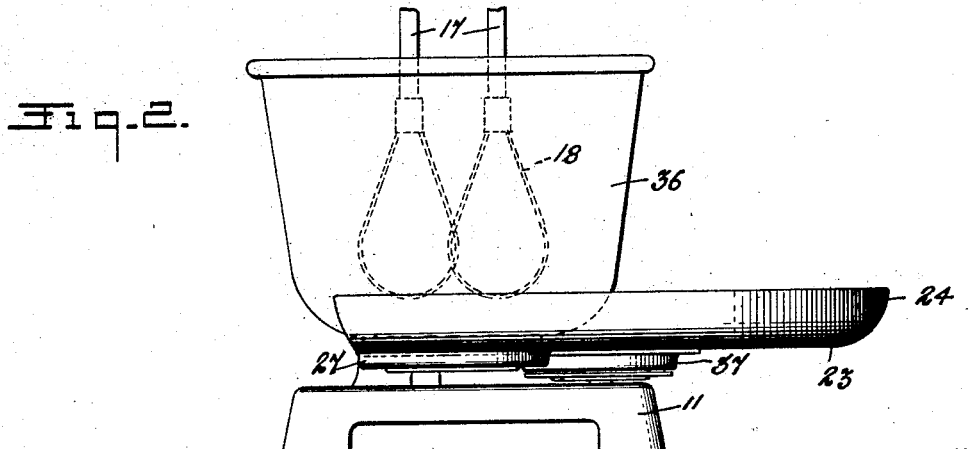

The drawings illustrate an embodiment of the invention and the views therein are as follows:

Figure 1 is a front elevation of the mixing machine with the turntable mounted on the base thereof and carrying a vessel of large diameter, Figure 2 is a fragmentary view showing the turntable carrying a vessel of small diameter, Figure 3 is a top plan view of the machine base with the turntable mounted thereon, Figure 4 is a cross-sectional view on the line 4—4 of Figure 3, Figure 5 is a bottom plan view of a modified turntable, and Figure 6 is a cross-sectional view of the same.

As illustrated in the drawings, the mixing machine has a base 11, an upright standard 12, motor 13, gear housing 14, and chucks 16, which removably secure the stems 17 of the mixing implements or beaters 18, and while, in the present instance, a pair of beaters have been illustrated, the applicant herein does not limit the invention to any specific number of mixing implements, as a single one or a plurality may be employed.

Referring to Figure 4, the base 11 has a pad 19 which is drilled at 21 to receive a stud 22 fixedly secured beneath the center of the turntable 23. This turntable has an upturned annular flange 24 with a cutout portion (see Figure 3) 26, as later explained.

At one side and offset from the center is a depressed circular portion 27 which is provided with a ball race 28 and which has rivets 29 forming a pivot upon which a disk or platform 31 is rotatably mounted. This disk is also provided with a ball race 32 and between said ball race and the ball race 28 of the depressed portion there is a plurality of ball bearings 33 to provide facile rotation of the disk or platform 31.

The stud 22 is of such length that it holds the turntable above the surface of the base, so that there is no friction between said surface and said turntable when the same is rotated about the stud 22.

In Figure 1 the large vessel 34 is mounted on the turntable 23 and said vessel is of such diameter that it fits snugly within the flange 24 and the location of the turntable is such that the mixing implement or beater is located at or near the edge of the vessel, so as to work the material along the side of the vessel, while the turntable and vessel are being rotated on the stud 22.

In Figure 2 a smaller vessel 36 is placed upon the disk or platform 31, and the base of this vessel is adapted to fit snugly against the annular flange 35 on said disk.

The cut-out portion 26 of the flange 24 is required for accommodating the smaller vessel 36, shown in Figure 2.

When the vessel 36 in Figure 2 is placed on the platform 31, the location of the beater or beaters will be such that the action thereof will cause the vessel and the disk 31 to rotate, and thus thoroughly mix the contents of the vessel.

With this type of turntable, it is unnecessary to change the location of the turntable for different sized vessels, and it is unnecessary to operate any mechanism for providing means for the proper location and rotation of different sized vessels.

Of course, it will be readily understood that this invention contemplates the locating of other disks or platforms for the accommodation of vessels of intermediate size, if required.

Figures 5 and 6 show a modified turntable in which ball bearing means are provided for the stud at the center of the turntable. In this construction the lower face of the turntable is provided with a dished out plate 37 which has an annular ball race 38 and a cooperating plate 39 with a ball race 41 to provide for the ball bearings 42.

The stud 43 is much shorter in length than the stud 22 of the other construction, so that the cooperating plate 39 rests on the surface of the base and the turntable with its dished plate 37 is adapted to rotate on the stud, which is fixedly secured to the cooperating plate 39.

Experiment has proven that when the smaller vessel is being used the action of the beater or beaters is such that there will be no rotation of the turntable on the studs 22 or 43, but that the vessel of smaller diameter will be gently rotated on the disk or platform 31, thus insuring the complete and thorough mixing of the contents of the vessel.

Of course, the mixing machine turntable illustrated herein may be modified in various ways without departing from the invention herein set forth and hereafter claimed.

The invention is hereby claimed as follows:

1. In a mixing machine having a base and a laterally fixed motor propelled mixing implement, a turntable for rotating mixing vessels of different diameters, said turntable having a centrally located stud, a single hole in the machine base for receiving the stud, a flange around the perimeter of said turntable for a large vessel, and a small offset rotatable platform in said turntable for vessels of smaller size.

2. A mixing machine having a stationary base, a single hole therein, a plate having a stud connected thereto and adapted to fit into said hole, a concentric turntable on said plate and rotatably attached to said stud, ball bearings between said plate and turntable, and a small offset rotatable platform in said turntable.

3. A mixing machine having a stationary base, a single hole therein, a plate having a stud connected thereto and adapted to fit into said hole, a concentric turntable on said plate and rotatably attached to said stud, ball bearings between said plate and turntable, a small offset rotatable platform in said turntable, and ball bearings between said turntable and platform.

4. In a mixing machine having a base and a laterally fixed motor propelled mixing implement, a turntable for rotating mixing vessels of different diameters, said turntable having a centrally located stud, a single hold in the machine base for receiving the stud, a flange around the perimeter of said turntable for a large vessel, an offset rotatable platform in said turntable for vessels of smaller size, and a flange around the platform for retaining a vessel thereon.

5. A mixing machine having a base, a single hole therein, a turntable having a stud adapted to fit into said hole for rotating said turntable, an offset depression therein, and a rotatable platform in said depression.

6. A mixing machine having a base, a single hole therein, a plate having a stud connected thereto and adapted to fit into said hole, a concentric turntable on said plate and rotatably attached to said stud, an offset depression in said turntable, and a rotatable platform in said depression.

7. A mixing machine turntable for vessels of different diameters, comprising a central stud for rotating said turntable, an offset depression in said turntable, and a platform pivotally mounted for free axial rotation in said depression.

8. A mixing machine turntable for vessels of different diameters comprising a central stud for rotating said turntable, ball bearings between said stud and turntable, an offset depression in said turntable, and a platform having a ball bearing mounting arranged for axial rotation in said depression.

PATRICK J. FITZGERALD.